United States Patent
Aisaka et al.

(10) Patent No.: US 10,177,595 B2
(45) Date of Patent: Jan. 8, 2019

(54) WIRELESS SENSOR

(71) Applicant: Murata Manufacturing Co., Ltd., Nagaokakyo-shi, Kyoto-fu (JP)

(72) Inventors: Yuko Aisaka, Nagaokakyo (JP); Takeshi Sato, Nagaokakyo (JP); Nobumitsu Amachi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/911,583

(22) Filed: Mar. 5, 2018

(65) Prior Publication Data
US 2018/0198314 A1    Jul. 12, 2018

Related U.S. Application Data

(63) Continuation of application No. PCT/JP2016/076346, filed on Sep. 7, 2016.

(30) Foreign Application Priority Data

Sep. 9, 2015   (JP) .................................. 2015-177662

(51) Int. Cl.
*H02J 7/00*       (2006.01)
*G08C 17/00*      (2006.01)
(Continued)

(52) U.S. Cl.
CPC .............. *H02J 7/025* (2013.01); *G08C 17/00* (2013.01); *G08C 17/02* (2013.01); *G08C 19/00* (2013.01);
(Continued)

(58) Field of Classification Search
CPC .... H02J 7/00; H02J 7/025; H02J 50/10; H02J 50/80; G08C 17/00; G08C 17/02; G08C 19/00
(Continued)

(56) References Cited

U.S. PATENT DOCUMENTS

2012/0038317 A1   2/2012  Miyamoto et al.
2012/0049840 A1   3/2012  Kawatoko et al.

FOREIGN PATENT DOCUMENTS

JP    2001-148087 A    5/2001
JP    2006-005978 A    1/2006
(Continued)

OTHER PUBLICATIONS

Official Communication issued in International Patent Application No. PCT/JP2016/076346, dated Oct. 11, 2016.

*Primary Examiner* — Hal Kaplan
(74) *Attorney, Agent, or Firm* — Keating & Bennett, LLP (57) ABSTRACT

A portable wireless sensor includes a power source, a sensor, a wireless communication circuit and a sensor control circuit obtaining data from the sensor and transmitting the data to outside through the wireless communication circuit, in which the power source includes a secondary battery, a power reception circuit receiving electric power supply in a non-contact manner, and a power source control circuit controlling charging of the secondary battery with the electric power received by the power reception circuit. The wireless sensor includes a standard mode to transmit the data obtained from the sensor to outside through the wireless communication circuit, and a diagnosis mode to diagnose at least one of the secondary battery and the sensor portion in a case where the power reception circuit receives electric power supply in a non-contact manner.

20 Claims, 6 Drawing Sheets

(51) Int. Cl.
   *G08C 19/00*   (2006.01)
   *H02J 7/02*    (2016.01)
   *G08C 17/02*   (2006.01)
   *H02J 50/10*   (2016.01)
   *H02J 50/80*   (2016.01)

(52) U.S. Cl.
   CPC ................ *H02J 7/00* (2013.01); *H02J 50/10* (2016.02); *H02J 50/80* (2016.02)

(58) Field of Classification Search
   USPC ........................................................ 307/104
   See application file for complete search history.

(56) References Cited

FOREIGN PATENT DOCUMENTS

| | | |
|---|---|---|
| JP | 2006-270555 A | 10/2006 |
| JP | 2008-037536 A | 2/2008 |
| JP | 2012-044735 A | 3/2012 |
| JP | 2012-048377 A | 3/2012 |

WIRELESS SENSOR

CROSS REFERENCE TO RELATED APPLICATIONS

This application claims the benefit of priority to Japanese Patent Application No. 2015-177662 filed on Sep. 9, 2015 and is a Continuation Application of PCT Application No. PCT/JP2016/076346 filed on Sep. 7, 2016. The entire contents of each application are hereby incorporated herein by reference.

BACKGROUND OF THE INVENTION

1. Field of the Invention

The present invention relates to a wireless sensor, and particularly, relates to a wireless sensor wirelessly transmitting data obtained by the sensor.

2. Description of the Related Art

In order to protect cultural properties (hereinafter, referred to as collected items) being kept in an art museum, a museum, or the like, from deterioration due to oxygen, ultraviolet, temperature, humidity (including dry and dew condensation), impact, corrosive gas, bugs, and the like, it is necessary for air conditioning, fumigation, or the like of the entire repository (room) to be managed, and for outer appearance management of a storage box in which a collected item is accommodated and actual item inspection of the collected item itself to be performed at an appropriate period. The actual item inspection of these management and inspection particularly includes a problem that the deterioration may be accelerated by reasons that (1) visual confirmation by an expert is needed and an inspection frequency is not easy to be increased (it is difficult to secure human resources, costs, places, or the like), (2) the collected items may be damaged by handling at the inspection, and (3) the items are contacted by bugs or harmful substances or exposed to outside air or light at the inspection, or the like, there is a demand for extending an inspection period as long as possible. In order to satisfy this demand, it has been requested to stably collect and manage data relating to deterioration of the collected items (specifically, data such as temperature and humidity, an illuminance, an oxygen concentration, or the like) while the storage box being sealed for a long period of time of approximately ten years.

In order to cope with this, techniques for collecting the data relating to the deterioration of the collected items while the storage box being sealed for a long period of time have been proposed in the past (for example, see Japanese Unexamined Patent Application Publication No. 2001-148087).

In Japanese Unexamined Patent Application Publication No. 2001-148087, a detection unit for detecting a status according to temperature, humidity, an illuminance, or the like in a display case and converting the status into a signal, and a transmission unit for wirelessly transmitting a status signal transmitted from this detection unit (the detection unit and the transmission unit are collectively referred to as a "wireless sensor") are provided in one display case without wiring from the outside, and an information processing unit for receiving and processing this status signal transmitted from the transmission unit is provided in the outside of the display case. This makes it possible to monitor the status in the display case using the information processing unit in the outside.

However, in a case where such a wireless sensor is operated for a long period of time, since aged deterioration of a sensor, a wireless circuit, and a battery and variation thereon are not able to be completely predicted in inspection when manufacturing, there is a problem that an expected operation lifetime is not able to be obtained. Particularly, increases in a dark current in a circuit (increase in a current flowing when stopping an intermittent operation during a long-term operation) and a battery self-discharge amount are problematic. For example, in a case where a dark current of a wireless sensor, which is designed in order to operate for ten years, with the dark current of a circuit of 1 µA, a current of 28 mA at operation, an operation frequency of 30 seconds/day, battery initial capacitance of 1900 mAh, and capacitance when being kept for ten years of 49%, becomes 5 µA for some reason, the operation lifetime drops to six years or lower, and data transmission is interrupted. This indicates not only that an item randomly appears whose storage box needs to be opened due to a failure of the wireless sensor from the collected items expected to be preserved for ten years, but also that since an actual item needs to be confirmed in many cases once the storage box is opened, a management load extremely increases.

SUMMARY OF THE INVENTION

Accordingly, preferred embodiments of the present invention provide wireless sensors able to significantly reduce a frequency of maintenance, for example, opening a storage box, taking out a wireless sensor, and exchanging a component, or the like, even in a case where a failure in which an expected operation lifetime is not able to be obtained occurs.

A wireless sensor according to a preferred embodiment of the present invention includes a power source supplying electric power; a sensor; a wireless communication circuit operating with the electric power supplied from the power source; and a sensor control circuit operating with the electric power supplied from the power source, obtaining data indicating a result detected by the sensor, and transmitting the obtained data to the outside through the wireless communication circuit, in which the power source includes a secondary battery, a power reception circuit receiving electric power supply in a non-contact manner, and a power source control circuit controlling charging of the secondary battery with the electric power received by the power reception circuit and supplying electric power from the secondary battery and the electric power received by the power reception circuit to the wireless communication circuit and the sensor control circuit, and the wireless sensor includes, as an operation mode, a standard mode to transmit the data obtained from the sensor by the sensor control circuit to the outside through the wireless communication circuit and a diagnosis mode to diagnose at least one of the secondary battery and the sensor in a case where the power reception circuit receives electric power supply in a non-contact manner.

Since the secondary battery is charged with the electric power received by the power reception circuit without direct contact, even in a case where an operation lifetime of the secondary battery is reduced by increase in a dark current or the like, it is possible to charge the secondary battery without opening a storage box and recover the wireless sensor to an operable state. Accordingly, even if a failure that an expected operation lifetime is not able to be obtained occurs, a frequency of maintenance, for example, opening the storage box, taking out the wireless sensor, and exchanging a component, or the like is significantly reduced.

Furthermore, since at least one of the secondary battery and the sensor is diagnosed as the diagnosis mode in a case where the power reception circuit receives the electric power supply without direct contact, a failure portion is able to be located or identified during the non-contact power supply in a case where the failure that the expected operation lifetime is not able to be obtained occurs. Additionally, since the diagnosis mode is executed during the non-contact power supply, a diagnosis in the standard mode is unnecessary, power consumption of the wireless sensor in the standard mode is significantly reduced, and thus the operation lifetime is extended.

Here, in the diagnosis mode, the power source control circuit may diagnose the secondary battery while charging the secondary battery with the electric power received by the power reception circuit.

In the diagnosis mode, since the secondary battery is diagnosed in parallel when the secondary battery is charged with the electric power received by the power reception circuit, a supplement of battery capacitance and the diagnosis of the secondary battery are performed in a short period of time.

Additionally, in the diagnosis mode, the power source control circuit may further diagnose the sensor by operating the sensor control circuit with the electric power received by the power reception circuit.

In the diagnosis mode, since the sensor is diagnosed by operating the sensor control circuit with the electric power received by the power reception circuit, the sensor is diagnosed under the electric power by non-contact power supply by which a large amount of electric power is supplied, a detailed diagnosis, for example, detection value data acquisition from the sensor in multiple times or the like, is able to be performed. Additionally, it is determined whether or not the sensor includes any failure in a state of being separated from the secondary battery, the wireless sensor is able to therefore be multilaterally diagnosed.

Additionally, in the diagnosis mode, the power source control circuit may further operate the sensor control circuit by a control instruction transmitted from the outside through the wireless communication circuit by operating the wireless communication circuit and the sensor control circuit with the electric power received by the power reception circuit.

In the diagnosis mode, since the sensor, the sensor control circuit, and a peripheral circuit are able to be diagnosed by remote control, it is possible to perform a diagnosis reflecting information relating to a failure and deterioration of the sensor, the sensor control circuit, and the peripheral circuit which is obtained after manufacturing the wireless sensor. Additionally, contents of a program stored by the sensor control circuit are able to be decreased, and thus a size of the program is reduced.

Additionally, the sensor control circuit may store a program, obtain the data in accordance with the program, and transmit the obtained data through the wireless communication circuit, the power source control circuit may further update, in the diagnosis mode, the program stored by the sensor control circuit by a program transmitted from the outside through the wireless communication circuit by operating the wireless communication circuit and the sensor control circuit with the electric power received by the power reception circuit.

In the diagnosis mode, since the wireless communication circuit and the sensor control circuit operate with the electric power received by the power reception circuit, the program stored by the sensor control circuit is updated by the program transmitted from the outside through the wireless communication circuit, the program is reliably updated in a state of being separated from the secondary battery, and it is possible to collect sensor data by the new program. Additionally, since the program stored by the sensor control circuit is able to be updated, contents of the program stored by the sensor control circuit are able to be decreased, and thus the size of the program is reduced. Furthermore, since the program is able to be updated, information obtained by a data collection after operation of the wireless sensor (a detection frequency or the like by the sensor) is able to be reflected in the program.

Additionally, the wireless sensor may operate in the standard mode in a case where the power reception circuit does not receive the electric power supply without direct contact, in the standard mode, the electric power from the secondary battery may be supplied to the wireless communication circuit and the sensor control circuit, the sensor control circuit may repeat acquisition of data indicating a result detected by the sensor and transmission of the obtained data through the wireless communication circuit in a constant or substantially constant period.

In the standard mode, since, by the electric power supply from the secondary battery, the data obtained by the sensor is transmitted to the outside through the wireless communication circuit in a constant or substantially constant period, a keeping status of a collected item in the storage box or the like is able to be periodically monitored in the outside.

Additionally, in the standard mode, the sensor control circuit may determine whether or not a voltage of the secondary battery is within a normal range, and only in a case where it is determined that the voltage is within the normal range, may obtain the data and transmit the data through the wireless communication circuit.

In the standard mode as well, it is determined whether or not the voltage of the secondary battery is within the normal range, the data collection is performed only in a case where it is determined that the voltage is within the normal range, and thus the data collection in a state of unstable electric power supply is able to be avoided. Furthermore, in a case where the data are not transmitted to the outside, it is possible to determine that there is possibility of occurrence of a failure in the secondary battery.

Additionally, a member to prevent liquid leaked from the secondary battery from splashing may further be included.

Even in a case where liquid leakage occurs by the failure of the secondary battery or the like, a negative effect on the collected item is able to be avoided.

Additionally, the wireless sensor may be portable.

For example, the wireless sensor is able to be installed in a storage box in which a collected item being kept in an art museum, a museum, or the like is stored.

Wireless sensors according to preferred embodiments of the present invention are able to significantly reduce a frequency of maintenance, for example, opening a storage box, taking out a wireless sensor, and exchanging a component, or the like, even if a failure that an expected operation lifetime is not able to be obtained occurs.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings. Note that, each preferred embodiment described below indicates one specific example of the present invention. Numerical values, shapes, materials, elements, arrangement positions and connection forms of the elements, steps, orders of the steps, or the like indicated in the following preferred embodiments are each one example, the present invention is not intended to be limited thereto. Additionally, elements which are not described in independent claims indicating the highest concept of the present invention among the elements of the preferred embodiments described below are described as arbitrary elements.

Figure 1:
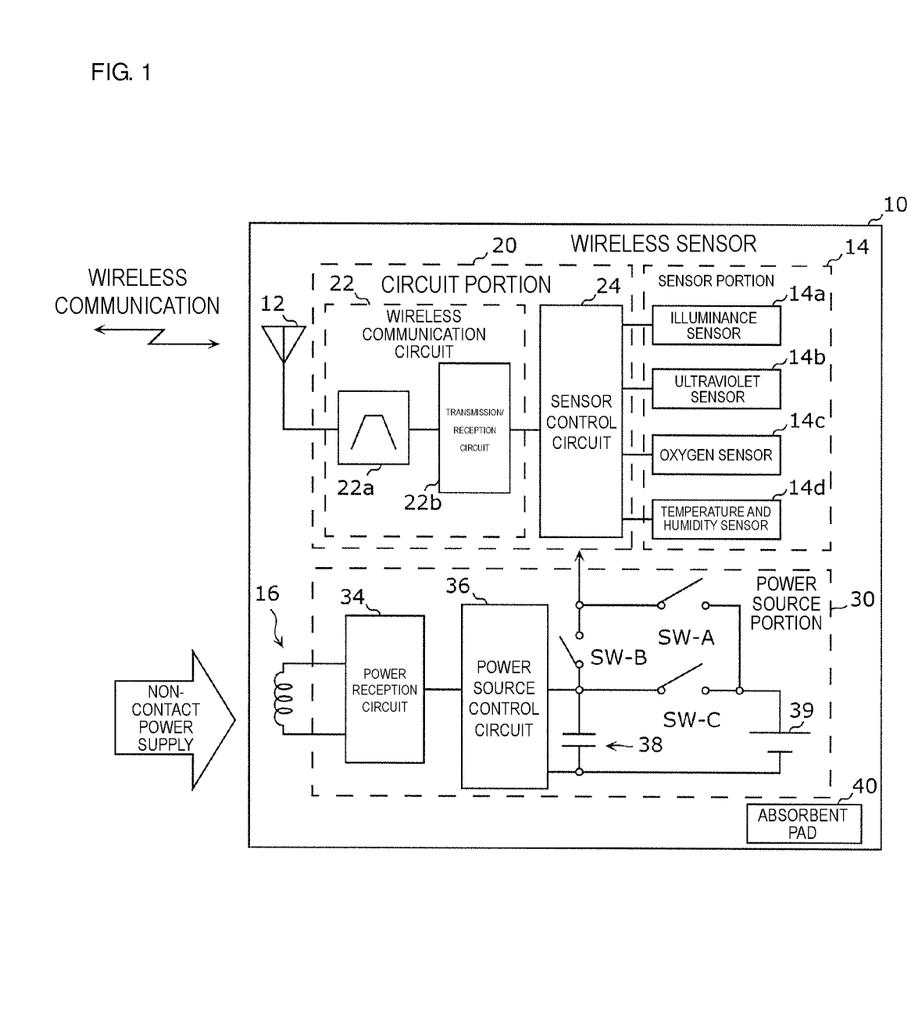
FIG. 1 is a block diagram illustrating a wireless sensor according to a preferred embodiment of the present invention.

FIG. 1 is a block diagram illustrating a wireless sensor 10 according to a preferred embodiment of the present invention. The wireless sensor 10 is a wireless sensor installed in the inside or the like of a storage box accommodating a collected item in an art museum (here, a portable wireless sensor), includes a communication antenna 12, a sensor portion 14, a power reception antenna 16, a circuit portion 20, a power source 30, and an absorbent pad 40.

The communication antenna 12 is an antenna that wirelessly communicates with the outside (for example, a host computer connected with a wireless gateway interposed therebetween).

The sensor portion 14 includes a group of sensors that detect various types of physical quantities, in the present preferred embodiment, includes an illuminance sensor 14a that detects an illuminance, an ultraviolet sensor 14b that detects ultraviolet, an oxygen sensor 14c that detects oxygen, and a temperature and humidity sensor 14d that detects temperature and humidity. The illuminance sensor 14a, the ultraviolet sensor 14b, and the temperature and humidity sensor 14d are connected to a sensor control circuit 24 with an I2C (registered trademark of Philips) bus, for example, interposed therebetween. The oxygen sensor 14c is, for example, an oxygen sensor including a galvanic cell, and outputs a voltage in accordance with a detected oxygen concentration to an A/D converter included in the sensor control circuit 24.

The circuit portion 20 is a main circuit of this wireless sensor 10, which operates with electric power supplied from the power source 30, and includes a wireless communication circuit 22 and the sensor control circuit 24.

The wireless communication circuit 22 includes a band pass filter 22a which passes only a signal of a frequency band for wireless communication, and a transmission/reception circuit 22b including a transmission amplifier, a reception amplifier, and the like for the wireless communication.

The sensor control circuit 24 obtains data indicating the various types of physical quantities (result) detected in the sensor portion 14, and controlling transmitting of the obtained data to the outside through the wireless communication circuit 22. In the present preferred embodiment, the sensor control circuit 24 is a microcomputer or the like in which a nonvolatile memory storing a control program, a processor executing the control program, a timer, a general purpose digital input/output port, an I/F for the I2C (registered trademark of Philips) bus, and a general purpose analog input/output port (A/D converter, D/A converter) or the like are provided. For example, the sensor control circuit 24 obtains data indicating a detection value from the illuminance sensor 14a, the ultraviolet sensor 14b, and the temperature and humidity sensor 14d through the I2C (registered trademark of Philips) bus, and obtains data indicating the detection value from the oxygen sensor 14c through the built-in A/D converter. Additionally, the sensor control circuit 24 communicates with a power source control circuit 36 through a digital input port GPIn1 and a digital output port GPOut4 which will be described later.

The power reception antenna 16 is an antenna defined by a coil or the like that receives electric power supplied in a non-contact manner.

The power source 30 is a circuit that supplies electric power to the circuit portion 20, and includes a power reception circuit 34, a power source control circuit 36, switches SW-A to SW-C, a capacitor 38, and a secondary battery 39.

The power reception circuit 34 is a circuit that receives electric power supplied in a non-contact manner through the power reception antenna 16, converts received AC electric power to DC electric power and supplies the converted power to the power source control circuit 36 herein.

The switches SW-A to SW-C are switches which open (turned off) or close (turned on) by control from the power source control circuit 36. To be more specific, the switch SW-A is a normally-on switch which changes whether or not to supply the electric power from the secondary battery 39 to the circuit portion 20. The switch SW-B is a normally-off switch which changes whether or not to supply the electric power supplied from the power reception circuit 34 through the power source control circuit 36 to the circuit portion 20. The switch SW-C is a normally-off switch which changes whether or not to supply the electric power supplied from the power reception circuit 34 through the power source control circuit 36 to the secondary battery 39 (that is, to charge).

The power source control circuit 36 is a circuit controlling charging of the secondary battery 39 with the electric power received by the power reception circuit 34 through the power reception antenna 16, and supplying the electric power from the secondary battery 39 and the electric power received by the power reception circuit 34 to the circuit portion 20 (the wireless communication circuit 22 and the sensor control circuit 24), and includes, for example, a sequencer or the like that controls the switches SW-A to SW-C. Accordingly, the power source control circuit 36 includes a power source regulator which generates DC voltage that stably supplies the DC electric power received from the power reception circuit 34 to the circuit portion 20. Additionally, the power source control circuit 36 includes three output ports GPOut1 to GPOut3 and one input port GPIn4 as general purpose digital input/output ports for control of the switches SW-A to SW-C and communication with the sensor control circuit 24. A connection destination and a function of each of the ports are shown below in Table 1.

TABLE 1

| Port | Connection Destination | Function at Low | Function at High |
|---|---|---|---|
| GPOut1 | switch SW-A GPIn1 of sensor control circuit | close instruction of standard mode | open instruction of diagnosis mode |
| GPOut2 | switch SW-B | open | close |
| GPOut3 | switch SW-C | open | close |
| GPIn4 | GPOut4 of sensor control circuit | power source control circuit operates | power source control circuit temporary stops |

As shown in Table 1, the output port GPOut1 of the power source control circuit 36 is connected to a control terminal of the switch SW-A and the input port GPIn1 of the sensor control circuit 24, closes the switch SW-A and instructs the sensor control circuit 24 to operate in a standard mode by outputting a Low potential, and opens the switch SW-A and instructs the sensor control circuit 24 to operate in a diagnosis mode by outputting a High potential. The output port GPOut2 of the power source control circuit 36 is connected to a control terminal of the switch SW-B, opens the switch SW-B by outputting a Low potential, and closes the switch SW-B by outputting a High potential. The output port GPOut3 of the power source control circuit 36 is connected to a control terminal of the switch SW-C, opens the switch SW-C by outputting a Low potential, and closes the switch SW-C by outputting a High potential. The input port GPIn4 of the power source control circuit 36 is connected to the output port GPOut4 of the sensor control circuit 24, the power source control circuit 36 operates when a Low potential is inputted, the power source control circuit 36 temporary stops when a High potential is inputted. Note that, the standard mode, the diagnosis mode and an operation of each of the input/output ports will be described later.

Each of the output ports GPOut1 to 3 of the power source control circuit 36 is pulled down, and fixed to the Low potential (is not changed) when the power reception circuit 34 does not receive electric power. Additionally, the output port GPOut4 of the sensor control circuit 24 is also pulled down, is fixed to the Low potential when not being supplied with the power source, and is always set to the Low potential except when the power source control circuit is temporary stopped.

The capacitor 38 is a capacitor that smoothes the electric power supplied from the power reception circuit 34 to the circuit portion 20 or the secondary battery 39 through the power source control circuit 36.

The secondary battery 39 is a battery that is able to be charged and discharged and that supplies the electric power to the circuit portion 20, and preferably is a nickel-metal hydride (NiMH) secondary battery which provides a risk of liquid leakage depending on an environment condition, but provides a long lifespan and no risk of firing, for example.

The absorbent pad 40 is an example of a member which prevents liquid leaked from the secondary battery 39 from splashing, in the present preferred embodiment, and is an absorbent pad including absorbent cotton that absorbs the electrolyte leaked from a galvanic cell included in the oxygen sensor 14c in addition to the secondary battery 39 to prevent the electrolyte from sticking to the collected item.

Figure 2:
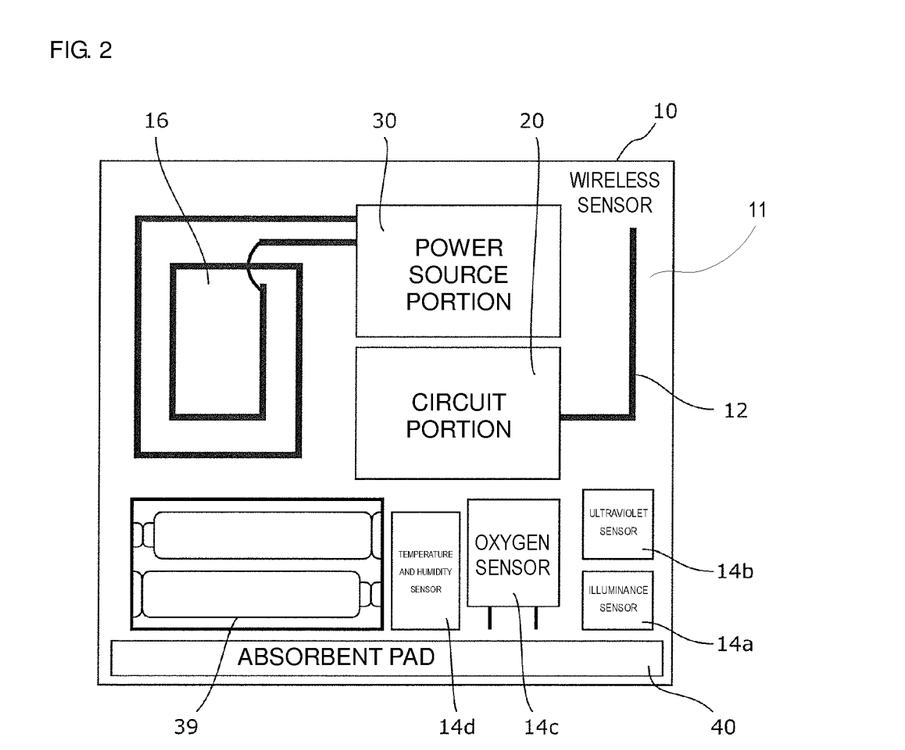
FIG. 2 is a diagram illustrating an example of an outer appearance of the wireless sensor illustrated in FIG. 1.

FIG. 2 is a diagram illustrating an example of an outer appearance of the wireless sensor 10 illustrated in FIG. 1. This diagram illustrates a schematic diagram of the wireless sensor 10 in which each element illustrated in FIG. 1 is mounted on an upper surface of one substrate 11, when viewed in a plan view. As illustrated in the present diagram, in this mounting example, in a plan view of the substrate 11, the power reception antenna 16 is located in an upper left region of the substrate 11, the power source 30 (however, excluding the secondary battery 39), the circuit portion 20, and the communication antenna 12 are located in an upper right region of the substrate 11, the secondary battery 39 is located in a lower left region of the substrate 11, the sensor portion 14 (the temperature and humidity sensor 14d, the oxygen sensor 14c, the illuminance sensor 14a, and the ultraviolet sensor 14b) is located in a lower right region of the substrate 11, and the absorbent pad 40 is located in the lowermost region of the substrate 11. Note that, the wireless sensor 10 is stored in a plastic cover, as a housing which is not illustrated, which is transparent such that visible light and ultraviolet light are transmitted through the cover and are taken into the illuminance sensor 14a and the ultraviolet sensor 14b, and in which an opening portion is provided in order to take the outside air into the temperature and humidity sensor 14d and the oxygen sensor 14c.

This wireless sensor 10 is installed by adhering to or bonding with an inner side surface or the like of the storage box and an upper portion in FIG. 2 is located on an upper side in a vertical direction, and a lower portion in FIG. 2 is located on a lower side in the vertical direction. Accordingly, in a state where the wireless sensor 10 is installed, the absorbent pad 40 is located on a lower side in the vertical direction of the secondary battery 39 and the oxygen sensor 14c and is able to absorb the electrolyte leaked from the secondary battery 39 and the galvanic cell of the oxygen sensor 14c. Additionally, taking into consideration of falling the housing of the wireless sensor 10 from the attachment position in the storage box, the opening portion of the plastic cover is provided with a thin cotton mesh and the electrolyte does not splash to the outside of the housing.

Figure 3:
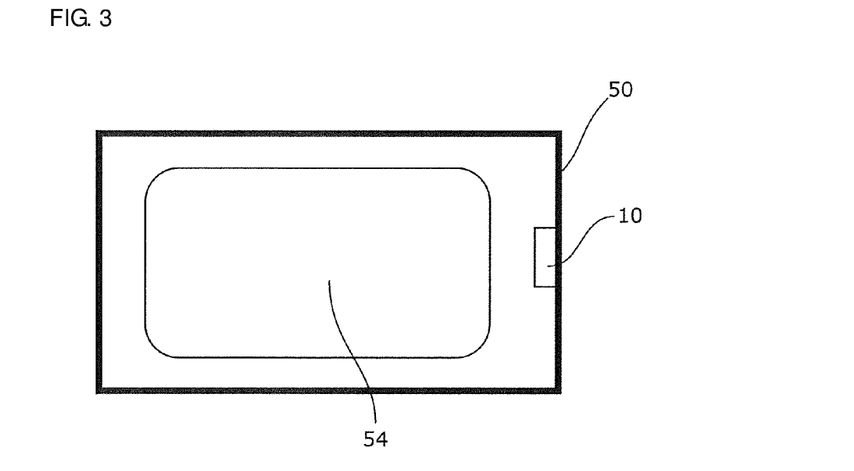
FIG. 3 is a diagram illustrating an installation example of the wireless sensor illustrated in FIG. 2.

FIG. 3 is a diagram illustrating an installation example of the wireless sensor 10 illustrated in FIG. 2. This diagram illustrates, in a case where the wireless sensor 10 is attached on an inner side surface of a storage box 50 in which a collected item 54 is stored, a schematic diagram when the storage box 50 is viewed from an upper surface.

Figure 4:
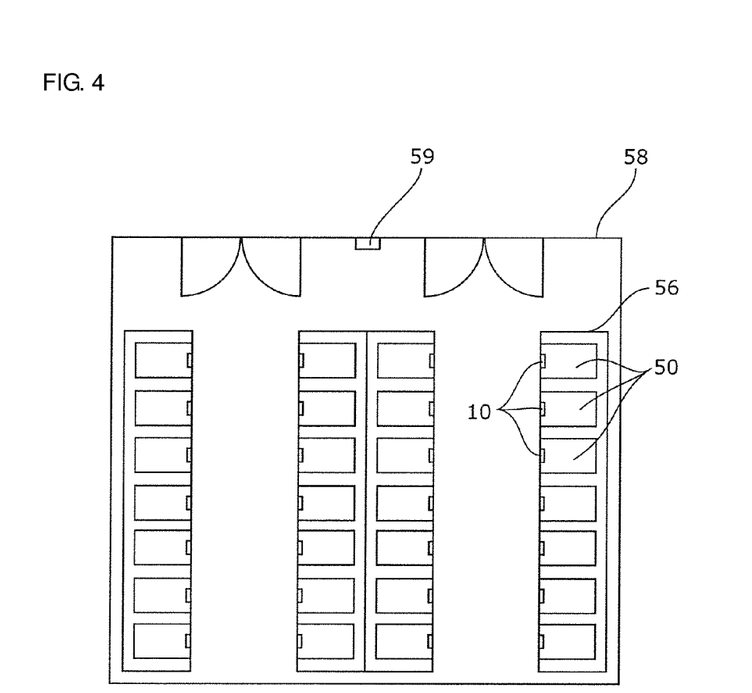
FIG. 4 is a layout diagram of a repository housing storage boxes in which the wireless sensors illustrated in FIG. 3 are each attached.

FIG. 4 is a layout diagram of a repository 58 which houses the storage boxes 50 in which the wireless sensors 10 illustrated in FIG. 3 are each attached. This diagram illustrates a state where the plurality of storage boxes 50 to which the wireless sensors 10 are each attached are located side by side in each of a plurality of housing shelves 56 provided in the repository 58. The wireless sensor 10 is attached on the inner side surface of a front surface of the storage box 50 (when the collected item accommodated in the storage box 50 is viewed from the front, a side surface of the storage box 50 located in the front). By the attachment position described above, during non-contact power supply, the storage box 50 need not be taken out from the housing shelf 56.

Additionally, in the repository 58, a wireless gateway (wireless GW) 59 that connects each of the wireless sensors 10 to a communication network in the outside by wirelessly communicating with each of the wireless sensors 10 is installed. The wireless GW 59 is a wireless gateway including a diversity antenna, for example. Each of the wireless sensors 10 communicates with a host computer connected to the communication network (not illustrated) through the wireless GW 59. Note that, in a case where the repository 58 is a wide room, the plurality of wireless GWs 59 which communicate with the plurality of wireless sensors 10 may be installed in the repository 58.

Figure 5:
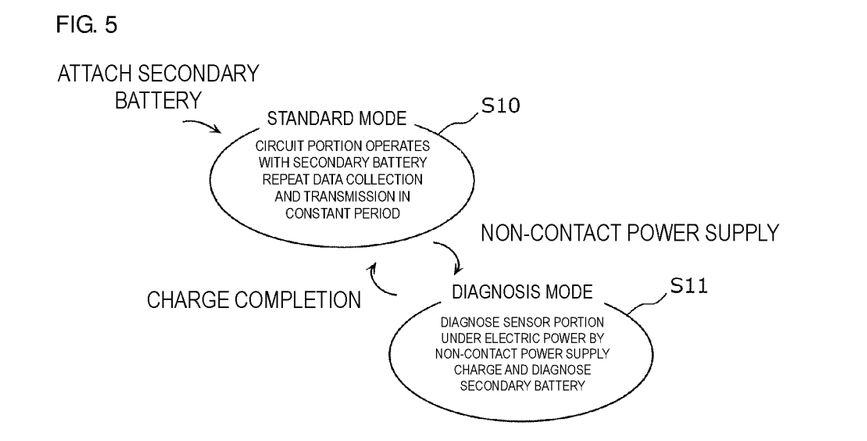
FIG. 5 is a state transition diagram illustrating operation modes of the wireless sensor illustrated in FIG. 1.

FIG. 5 is a state transition diagram illustrating operation modes of the wireless sensor 10 illustrated in FIG. 1.

The wireless sensor 10 includes, as main operation modes, a standard mode S10 that transmits data obtained from the sensor portion 14 by the sensor control circuit 24 to the outside through the wireless communication circuit 22, and a diagnosis mode S11 that diagnoses at least one of the secondary battery 39 and the sensor portion 14 (in the present preferred embodiment, both the secondary battery 39 and the sensor portion 14) in a case of receiving electric power supply through the power reception antenna 16 and the power reception circuit 34 in a non-contact manner.

To be more specific, the standard mode S10 is a normal operation mode of the wireless sensor 10 when not receiving the non-contact power supply. The standard mode S10 is activated by the secondary battery 39 being attached in a state where the wireless sensor 10 is not receiving the non-contact power supply.

In the standard mode S10, a power source voltage is not supplied to the power source control circuit 36, the output ports GPOut1 to 3 of the power source control circuit 36 are fixed to the Low potential. As a result, only the switch SW-A closes among the switches SW-A to SW-C, the electric power from the secondary battery 39 is supplied to the circuit portion 20. The sensor control circuit 24 repeats obtaining data indicating physical quantity (result) detected by the sensor portion 14 and transmitting the obtained data through the wireless communication circuit 22 in a constant or substantially constant period. With this, a keeping status or the like of the collected item 54 in the storage box 50 is able to be periodically monitored in the outside (host computer). At this time, the sensor control circuit 24 determines whether or not the voltage of the secondary battery 39 is within a normal range, only in a case where it is determined that the voltage is within the normal range, obtains the data from the sensor portion 14 and transmits the data through the wireless communication circuit 22. With this, in the standard mode as well, it is determined whether or not the voltage of the secondary battery 39 is within the normal range, a data collection is performed only in a case where it is determined that the voltage is within the normal range, and the data collection in a state of unstable electric power supply is therefore avoided. Furthermore, in a case where the data are not transmitted to the outside in a constant or substantially constant period, it is possible to determine that there is possibility of occurrence of a failure in the secondary battery 39.

When the non-contact power supply is performed, the operation mode of the wireless sensor 10 transits from the standard mode S10 to the diagnosis mode S11. The diagnosis mode S11 is an operation mode that diagnoses whether or not abnormality occurs in the wireless sensor 10, and starts by the non-contact power supply.

In the diagnosis mode, the power source control circuit 36 diagnoses the sensor portion 14 by closing only the switch SW-B among the switches SW-A to SW-C and operating the sensor control circuit 24 with the electric power received by the power reception circuit 34. With this, since the sensor portion 14 is diagnosed by the electric power by the non-contact power supply by which a large amount of electric power is supplied, a detailed diagnosis, for example, detection value data acquisition from the sensor portion 14 in multiple times or the like is able to be performed. Furthermore, it is determined whether or not the sensor portion 14 includes any failure in a state of being separated from the secondary battery 39, the wireless sensor 10 is able to be multilaterally diagnosed.

Additionally, in the diagnosis mode, the power source control circuit 36 diagnoses the secondary battery 39 while charging the secondary battery 39 with the electric power received by the power reception circuit 34 by closing only the switch SW-C among the switches SW-A to SW-C. With this, the secondary battery is diagnosed in parallel when the secondary battery 39 is charged, a supplement of battery capacitance and the diagnosis is able to be performed in a short period of time. When completing the charge, the operation mode of the wireless sensor 10 transits from the diagnosis mode S11 to the standard mode S10.

Next, operations of the wireless sensor 10 in the present preferred embodiment will be described.

Figure 6:
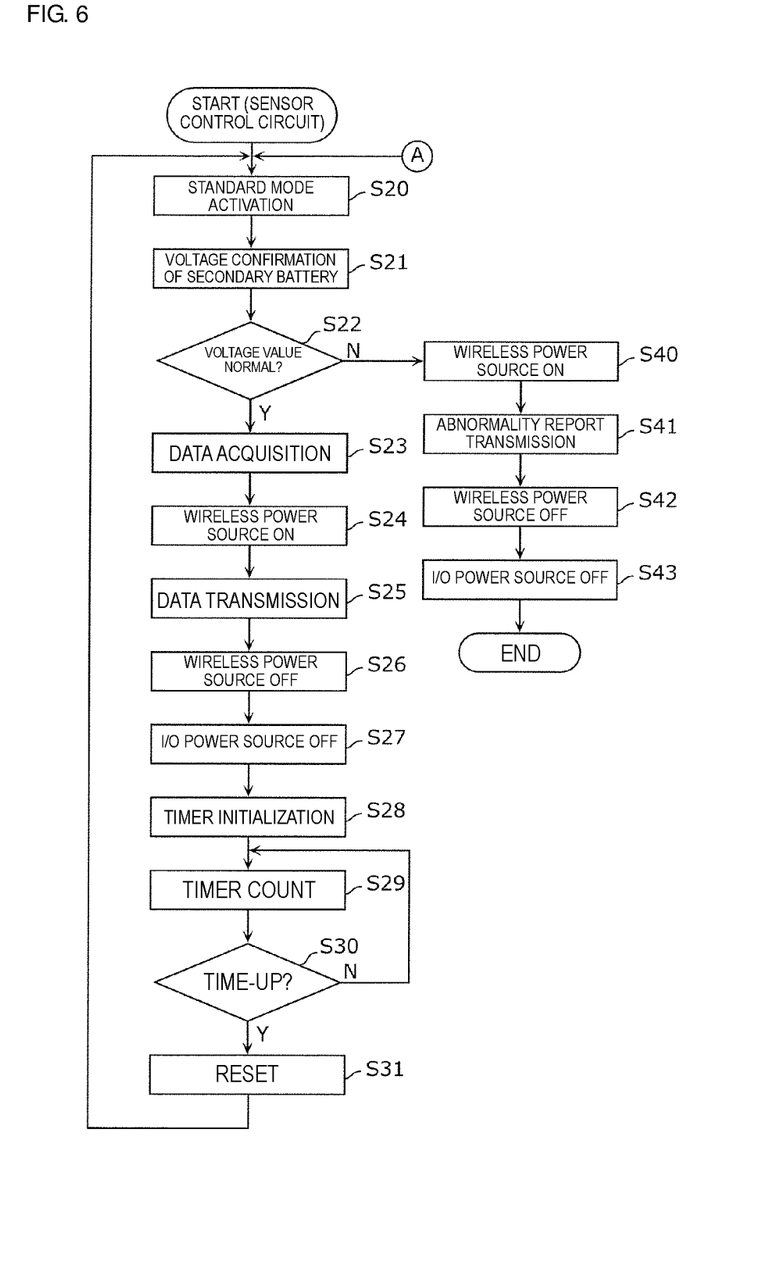
FIG. 6 is a flowchart illustrating operations of the wireless sensor in a standard mode in a preferred embodiment of the present invention.

FIG. 6 is a flowchart illustrating operations of the wireless sensor 10 in the standard mode in the present preferred embodiment. This drawing illustrates operation procedures of the sensor control circuit 24.

In a state of not receiving the non-contact power supply (standard mode S10), the power source voltage is not supplied to the power source control circuit 36, the output ports GPOut1 to 3 of the power source control circuit 36 are fixed to the Low potential. As a result, a state is such that only the switch SW-A closes among the switches SW-A to SW-C, and the Low potential is inputted into the input port GPIn1 of the sensor control circuit 24. In a case where the secondary battery 39 is attached to the wireless sensor 10 in this state, the electric power from the secondary battery 39 is supplied to the circuit portion 20 through the switch SW-A, and the Low potential is inputted into the input port GPIn1 of the sensor control circuit 24, the sensor control circuit 24 is therefore activated in the standard mode (S20).

The sensor control circuit 24 activated in the standard mode, first, determines whether or not the voltage of the secondary battery 39 is within the normal range (S21). Specifically, the sensor control circuit 24 measures a voltage of a terminal which receives the electric power supply using a built-in A/D converter, determines whether or not the measured voltage is within the range prescribed in advance.

As a result, in a case where it is determined that the voltage of the secondary battery 39 is within the normal range (Y at S22), the sensor control circuit 24 obtains data indicating physical quantity (result) detected by the sensor portion 14, by driving each of the sensors of the sensor portion 14 (the illuminance sensor 14*a*, the ultraviolet sensor 14*b*, the oxygen sensor 14*c*, and the temperature and humidity sensor 14*d*) (S23). Specifically, the sensor control circuit 24 obtains data indicating a detection value from the illuminance sensor 14*a*, the ultraviolet sensor 14*b*, and the temperature and humidity sensor 14*d* through the I2C (registered trademark of Philips) bus, and obtains data indicating a detection value from the oxygen sensor 14*c* through the built-in A/D converter.

Subsequently, the sensor control circuit 24 starts electric power supply to the transmission/reception circuit 22*b* (wireless power source ON) by enabling the transmission/reception circuit 22*b* (S24), and then wirelessly transmits the data obtained from the sensor portion 14 to the outside (here, the connected host computer with the wireless GW 59 interposed therebetween) through the wireless communication circuit 22 and the communication antenna 12 (S25).

When the transmission is finished, in order to significantly reduce power consumption, the sensor control circuit 24 ends the electric power supply to the transmission/reception circuit 22*b* (wireless power source OFF) by disabling the transmission/reception circuit 22*b* (S26), and furthermore, turns off a power source for input/output port (I/F for the I2C (registered trademark of Philips) bus, a general purpose analog input/output port, or the like) that controls the sensor portion 14 (I/O power source OFF) (S27).

Subsequently, in order to stand by for a constant or substantially constant period of time, the sensor control circuit 24 initializes and starts a built-in timer (S28), then reads a timer value (timer count) (S29), and determines whether or not the read timer value reaches a predetermined value (the time is up) (S30). The reading of the timer value (S29) and the determination (S30) are repeated until the timer value reaches the predetermined value, in a case where it is determined that the timer value reaches the predetermined value (the time is up) (Y at S30), the operation thereof is reset (S31), and the operations in the standard mode are repeated again (S20 to S31).

As described above, in a state of not receiving the non-contact power supply (standard mode), the electric power from the secondary battery 39 is supplied to the circuit portion 20, and in a case where the voltage of the secondary battery 39 is within the normal range, the data collection in which the detection value in the sensor portion 14 is transmitted to the wireless GW 59 with wireless communication is repeated at a constant or substantially constant period. With this, the keeping status or the like of the collected item 54 in the storage box 50 is able to be periodically monitored in the outside (host computer).

On the other hand, in a voltage confirmation of the secondary battery 39 (S21), in a case where it is determined that the voltage of the secondary battery 39 is not within the normal range (N at S22), the sensor control circuit 24 starts the electric power supply to the transmission/reception circuit 22*b* by enabling the transmission/reception circuit 22*b* (wireless power source ON) (S40), and then wirelessly transmits a report indicating that the voltage of the secondary battery 39 is not within the normal range (abnormality report) to the outside (here, the connected host computer with the wireless GW 59 interposed therebetween) through the wireless communication circuit 22 and the communication antenna 12 (S41).

When the transmission is finished, in order to significantly reduce the power consumption, the sensor control circuit 24 ends the electric power supply to the transmission/reception circuit 22*b* by disabling the transmission/reception circuit 22*b* (wireless power source OFF) (S42), and furthermore, turns off the power source for the input/output port that controls the sensor portion 14 (I/O power source OFF) (S43) to end (shut down) the operations in the standard mode.

As described above, in the standard mode, it is determined whether or not the voltage of the secondary battery 39 is within the normal range, in a case where it is determined that the voltage is not within the normal range, the abnormality report is transmitted to the outside with the wireless communication. The host computer connected to the wireless sensor 10 with the wireless GW 59 interposed therebetween recognizes that the voltage of the secondary battery 39 of the wireless sensor 10 is not within the normal range, and is able to notify an operator of the failure of the wireless sensor 10 to request a countermeasure. Additionally, since the operations of the wireless sensor 10 end thereafter, it is possible to avoid more electric power consumption in the wireless sensor 10.

Note that, in the abnormality report, not only a matter indicating that the voltage of the secondary battery 39 is not within the normal range, but also the voltage of the secondary battery 39 and the data indicating the detection value obtained from the sensor portion 14 or the like may be included.

Additionally, although a case in which the abnormality report is not transmitted may arise in a case where the voltage of the secondary battery 39 rapidly drops or the like, even in such a case, the host computer connected to the wireless sensor 10 with the wireless GW 59 interposed therebetween is able to determine that there is possibility of occurrence of the failure in the secondary battery 39 by detecting no data transmission from the wireless sensor 10 at a constant or substantially constant period and notify the operator of the abnormality.

Figure 7:
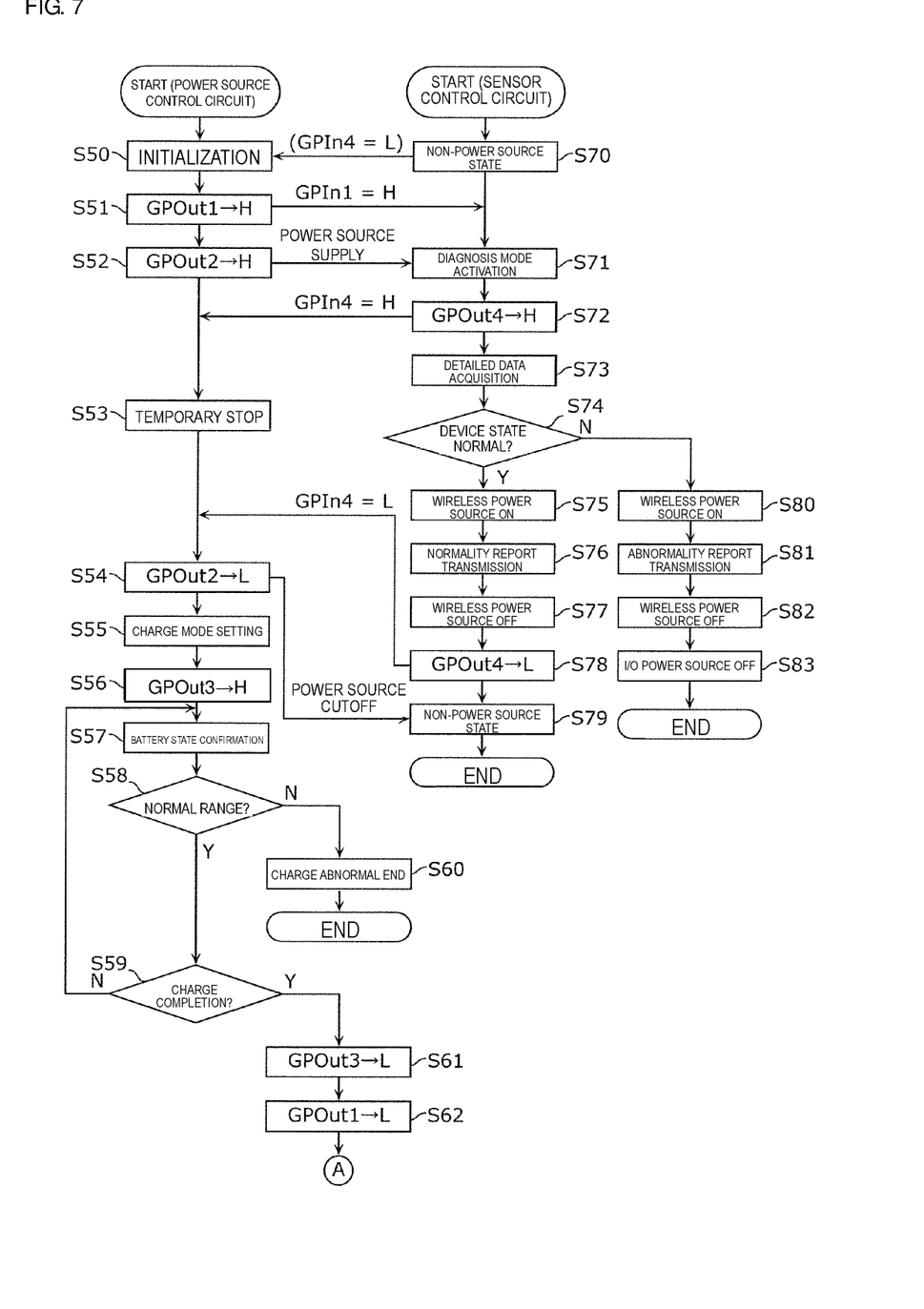
FIG. 7 is a flowchart illustrating operations of the wireless sensor in a diagnosis mode in a preferred embodiment of the present invention.

FIG. 7 is a flowchart illustrating operations of the wireless sensor 10 in the present preferred embodiment in the diagnosis mode. This drawing illustrates, in a state where the voltage of the secondary battery drops and the operations of the sensor control circuit 24 end, operation procedures of the power source control circuit 36 (steps S50 to S62) and operation procedures of the sensor control circuit 24 (S70 to S83).

In the power source 30, when the non-contact power supply through the power reception antenna 16 and the power reception circuit 34 is performed, the power source control circuit 36 is activated by receiving the electric power supply from the power reception circuit 34 and performs an initialization process (S50). Specifically, the power source control circuit 36 sets the built-in general purpose digital input/output ports to an output mode or an input mode (set the three output ports GPOut1 to GPOut3 and the one input port GPIn4), and sets the power source regulator to a constant or substantially constant voltage output mode in accordance with the power source voltage supplied to the circuit portion 20. Note that, by the initialization process, the three output ports GPOut1 to GPOut3 are fixed to the Low potential.

In the initialization process of the power source control circuit 36, the sensor control circuit 24 is in a state of not receiving the electric power supply (non-power source state) (S70), and outputs the Low potential from the output port GPOut4. In other words, the Low potential is inputted into the input port GPIn4 of the power source control circuit 36.

When the initialization process is finished, first, the power source control circuit 36 sets the output port GPOut1 to the High potential (S51) to open the switch SW-A (as a result, all the switches SW-A to SW-C open) and to be in a state where the sensor control circuit 24 is notified of the diagnosis mode.

Subsequently, the power source control circuit 36 sets the output port GPOut2 to the High potential (S52) to close the switch SW-B (as a result, only the switch SW-B closes among the switches SW-A to SW-C). With this, the electric power by the constant or substantially constant voltage from the built-in power source regulator is supplied to the circuit portion 20.

The sensor control circuit 24 receiving the electric power supply is activated in the diagnosis mode because the High potential is inputted into the input port GPIn1 (S71).

The sensor control circuit 24 activated in the diagnosis mode sets, first, the output port GPOut4 to the High potential (S72). With this, the power source control circuit 36 temporarily stops the operation because the High potential is inputted into the input port GPIn4 (S53).

Subsequently, in order to diagnose each of the sensors of the sensor portion 14 (the illuminance sensor 14*a*, the ultraviolet sensor 14*b*, the oxygen sensor 14*c*, and the temperature and humidity sensor 14*d*), the sensor control circuit 24 obtains detailed data from the sensor portion 14 (S73). For example, the sensor control circuit 24 obtains the detection value data from each of the sensors (the illuminance sensor 14a, the ultraviolet sensor 14b, the oxygen sensor 14c, and the temperature and humidity sensor 14d) at a constant or substantially constant period multiple times, and, by determining whether or not a value of the obtained data is within the predetermined range, or whether or not the data taken multiple times do not vary, determines whether or not the sensor portion 14 normally operates (whether or not the device state is normal).

As a result, in a case where it is determined that the sensor portion 14 does not normally operate (N at S74), the sensor control circuit 24 turns on the electric power supply to the transmission/reception circuit 22b (wireless power source ON) by enabling the transmission/reception circuit 22b (S80), and then wirelessly transmits a report indicating that the sensor portion 14 is not normally operating (abnormality report) to the outside (here, the connected host computer with the wireless GW 59 interposed therebetween) through the wireless communication circuit 22 and the communication antenna 12 (S81). Thereafter, the sensor control circuit 24 turns off the electric power supply to the transmission/reception circuit 22b (wireless power source OFF) by disabling the transmission/reception circuit 22b (S82), and furthermore, turns off the power source for the input/output port that controls the sensor portion 14 (I/O power source OFF) (S83) to end (shut down) the operations.

Note that, in the abnormality report, not only a matter indicating that the sensor portion 14 does not normally operate, but also data indicating the detection value obtained from the sensor portion 14 or the like may be included. Additionally, in a case where an abnormality occurs in the wireless communication circuit 22 and the wireless communication is disabled, reports (the abnormality report and a normality report which will be described later) are not transmitted at a predetermined timing, and thus the host computer connected to the wireless sensor 10 with the wireless GW 59 interposed therebetween is able to detect that there is an abnormality.

On the other hand, in a case where it is determined that the sensor portion 14 normally operates (Y at S74), the sensor control circuit 24 turns on the electric power supply to the transmission/reception circuit 22b (wireless power source ON) by enabling the transmission/reception circuit 22b (S75), then wirelessly transmits a report indicating that the sensor portion 14 normally operates (normality report) to the outside (here, the connected host computer with the wireless GW 59 interposed therebetween) through the wireless communication circuit 22 and the communication antenna 12 (S76), and thereafter turns off the electric power supply to the transmission/reception circuit 22b (wireless power source OFF) by disabling the transmission/reception circuit 22b (S77), then sets the output port GPOut4 to the Low potential (S78).

With this, the power source control circuit 36 ends the temporary stop until this time because the Low potential is inputted in the input port GPIn4, resumes the operation, sets the output port GPOut2 to the Low potential (S54) to open the switch SW-B (as a result, all the switches SW-A to SW-C open), and cuts off the electric power supply to the circuit portion 20. As a result, the sensor control circuit 24 is in a state of not receiving the electric power supply (non-power source state) (S79), and ends the operations.

Subsequently, the power source control circuit 36 sets the built-in power source regulator to a mode that charges the secondary battery 39 (S55), then sets the output port GPOut3 to the High potential (S56) to close the switch SW-C (as a result, only the switch SW-C closes among the switches SW-A to SW-C), and charges the secondary battery 39 while measuring the terminal voltage and current of the secondary battery 39 (confirming a battery state) (S57).

During the charging, the power source control circuit 36 determines whether or not the measured voltage and current are within the normal range (S58). As a result, in a case where it is determined that the measured voltage and current are not within the normal range (N at S58), the power source control circuit 36 immediately ends the operations as a charge abnormality (S60). With this, since the charge ends in a short period of time and the wireless sensor 10 does not operate when starting the non-contact power supply, the operator performing the non-contact power supply is able to determine that there is an abnormality in the power source 30 of the wireless sensor 10.

On the other hand, in a case where it is determined that the measured voltage and current are within the normal range (Y at S58), the power source control circuit 36 subsequently determines whether or not the charge is completed by determining whether or not the measured voltage and current are within the predetermined range (S59), and repeats the charge processes (S57 to S59) until it is determined that the charge is completed.

When the charge ends (Y at S59), the power source control circuit 36 sets the output port GPOut3 to the Low potential (S61) to open the switch SW-C (as a result, all the switches SW-A to SW-C open), and cuts off the connection to the secondary battery 39. Thereafter, the power source control circuit 36 sets the output port GPOut1 to the Low potential (S62) to close the switch SW-A (as a result, only the switch SW-A closes among the switches SW-A to SW-C). With this, the electric power from the secondary battery 39 is supplied to the circuit portion 20 through the switch SW-A, the sensor control circuit 24 is activated in the standard mode (FIG. 6).

As described above, according to the wireless sensor 10 of the present preferred embodiment, since the secondary battery is charged with the electric power received by the power reception circuit 34 in a non-contact manner, even in a case where the operation lifetime of the secondary battery 39 shortens due to a dark current increase or the like, it is possible to recover the wireless sensor 10 to an operable state by charging the secondary battery 39 without opening the storage box 50. Accordingly, even if a failure that the expected operation lifetime is not able to be obtained occurs, a frequency of maintenance, for example, opening the storage box 50, taking out the wireless sensor 10, and exchanging a component or the like is significantly reduced.

Furthermore, in a case where the power reception circuit 34 receives the electric power supply in a non-contact manner, since at least one of the secondary battery 39 and the sensor portion 14 is diagnosed as the diagnosis mode, in a case where a failure that the expected operation lifetime is not able to be obtained occurs, a failure location is able to be determined during the non-contact power supply. Additionally, since the diagnosis mode is executed during the non-contact power supply, the diagnosis in the standard mode is unnecessary, the power consumption of the wireless sensor 10 in the standard mode is significantly reduced, and thus the operation lifetime is extended.

Additionally, in the diagnosis mode, since the sensor portion 14 is diagnosed using the electric power by the non-contact power supply by which the large amount of electric power is supplied, a detailed diagnosis, for example, detection value data acquisition from the sensor portion 14 in multiple times or the like is able to be performed. Furthermore, it is determined whether or not the sensor portion 14 includes any failure in a state of being separated from the secondary battery 39, a multilateral diagnosis of the wireless sensor 10 is able to be performed.

Additionally, in the diagnosis mode, since the secondary battery 39 is diagnosed in parallel when the secondary battery 39 is charged with the electric power received in the non-contact power supply, a supplement of battery capacitance and the diagnosis of the secondary battery 39 are able to be performed in a short period of time.

Additionally, since the wireless sensor 10 is provided with the absorbent pad 40 that absorbs the electrolyte leaked from the secondary battery 39 and the galvanic cell included in the oxygen sensor 14c, even in a case where the liquid leakage occurs by the failure of the secondary battery and the galvanic cell, a negative effect on the collected item is able to be avoided.

As described above, according to the present preferred embodiment, even if the wireless sensor 10 includes a minor failure, an actual item confirmation with unpacking the collected item is unnecessary, state monitoring of the collected item being kept for a long term is reliably performed. Additionally, by collecting data through long-term monitoring, it is possible to determine a deterioration condition of the collected item. Furthermore, data items and measurement items for the state monitoring in the standard mode are able to be selected, and thus the operation lifetime of the wireless sensor 10 is able to be extended.

Note that, in the above-described preferred embodiments, although the operations in a state where the voltage of the secondary battery drops and the operations of the sensor control circuit 24 end are described, even in a state where the voltage of the secondary battery is normal, basic operations do not change. In other words, since, by performing the non-contact power supply, initializing the power source control circuit, and then setting the GPOut1 to the High potential, the connection of the secondary battery to the sensor control circuit is cut off and the sensor control circuit is turned off, a state that is the same as or similar to the non-power source state S70 is obtained. Subsequently, when the GPOut2 is set to the High potential and the power source is supplied, since the GPIn1 of the sensor control circuit is at the High potential, the wireless sensor 10 is activated in the diagnosis mode.

Note that, in the above-described preferred embodiments, in the diagnosis mode, the sensor control circuit 24 diagnoses the sensor portion 14 in accordance with a built-in program, but may operate (the diagnosis of the sensor portion 14 or the like) in accordance with a control instruction transmitted from the outside (the connected host computer with the wireless GW 59 interposed therebetween or the like).

Figure 8:
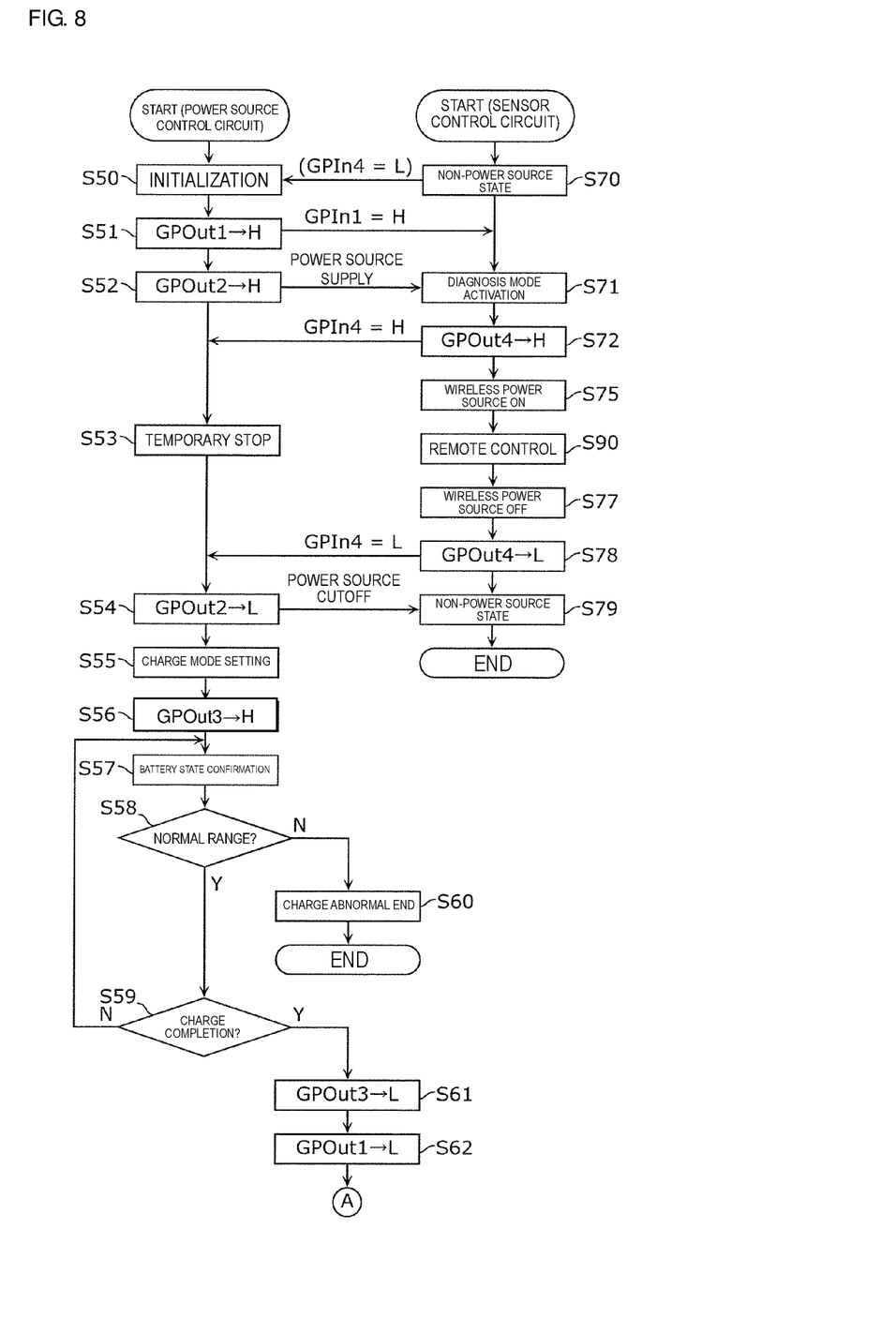
FIG. 8 is a flowchart illustrating operations of the wireless sensor in a variation of a preferred embodiment of the present invention.

FIG. 8 is a flowchart illustrating operations of the wireless sensor 10 in the diagnosis mode in a case where the sensor control circuit 24 operates in accordance with a control instruction transmitted from the outside, as a variation of the above-described preferred embodiments. This flowchart corresponds to a flowchart in which steps S73, S74, and S80 to S83 are removed from and a step S90 is added to the flowchart illustrated in FIG. 7. The present variation is obtained by changing the program stored by the sensor control circuit 24 in the wireless sensor 10 in the above-described preferred embodiments. The following will only describe differences from the flowchart in FIG. 7.

The sensor control circuit 24 activated in the diagnosis mode (S71) sets the output port GPOut4 to the High potential to temporarily stop the power source control circuit 36 (S72), then turns on the electric power supply to the transmission/reception circuit 22b (wireless power source ON) (S75) by enabling the transmission/reception circuit 22b, and a remote control mode is started (S90).

In the remote control mode, the sensor control circuit 24 receives a control instruction from the connected host computer with the wireless GW 59 interposed therebetween, and operates in accordance with the received control instruction. The control instruction may be an instruction to diagnose the sensor portion 14 in detail as described in steps S73, S74, and S80 to S83 in FIG. 7, or, instead of or in addition to such a detailed diagnosis, may be an instruction to perform a desired diagnosis or causing a desired operation with respect to the sensor portion 14, the sensor control circuit 24, or a peripheral circuit (the wireless communication circuit 22 or the like). Such a control instruction may be incorporated in a program stored by the host computer in advance, or may be dynamically generated in accordance with an instruction obtained by the host computer from operator.

When the operation in the remote control mode is finished, the sensor control circuit 24 turns off the electric power supply to the transmission/reception circuit 22b (wireless power source OFF) by disabling the transmission/reception circuit 22b (S77), then causes the power source control circuit 36 to resume the operation thereof by setting the output port GPOut4 to the Low potential (S78).

As described above, according to the present variation, in the diagnosis mode, since the sensor portion 14, the sensor control circuit 24, and peripheral circuit are able to be diagnosed by the remote control, it is possible to perform the diagnosis reflecting information relating to a failure and deterioration of the sensor, the sensor control circuit, and the peripheral circuit which is obtained after manufacturing the wireless sensor. Additionally, contents of the program stored by the sensor control circuit are able to be decreased, and thus a size of the program is reduced.

Note that, the control instruction transmitted to the sensor control circuit 24 from the host computer in the remote control mode may be an instruction to update the program stored by the sensor control circuit 24. With this, since the program stored by the sensor control circuit 24 is updated by the program transmitted from the host computer through the wireless communication circuit 22, the program is reliably updated in a state of being separated from the secondary battery 39, the sensor data collection by a new program is able to be performed. Additionally, since the program stored by the sensor control circuit 24 is able to be updated, the contents of program stored by the sensor control circuit 24 are able to be decreased, and thus the size of the program is reduced. Furthermore, since the program is able to be updated after the operation of the wireless sensor 10, the information obtained by the data collection after the operation of the wireless sensor 10 (a detection frequency by the sensor portion 14 or the like) is able to be reflected in the program.

Although the wireless sensors according to the present invention has been described on the basis of the preferred embodiments and the variation of the preferred embodiments, the present invention is not intended to be limited to the preferred embodiments and the variation of the preferred embodiments. The present invention also encompasses variations obtained by adding various changes to the present preferred embodiments or the variation of the preferred embodiments, which are conceived by those skilled in the art, or other preferred embodiments that are provided by combining a portion of elements in the above-described preferred embodiments or the variation of the preferred embodiments, as long as they do not depart from the gist of the present invention.

For example, in the above-described preferred embodiments, although both the secondary battery 39 and the sensor portion 14 are diagnosed in the diagnosis mode, it is not absolutely necessary for both of them to be diagnosed. By diagnosing at least one of them, since items to be diagnosed are reduced in the standard mode in which the operations are performed by the electric power supply from the secondary battery 39, the power consumption in the standard mode is reduced.

Additionally, in the above-described preferred embodiments, in the standard mode, although a data collection for all the sensors of the sensor portion 14 is performed, a data collection for only some of the sensors may be performed. Additionally, in repetition of the data collection, a combination of the sensors to be a target in one data collection may be changed. With this, in accordance with an amount of the power consumption, a data collection frequency is controlled for each sensor, the operation lifetime of the wireless sensor 10 is able to be extended.

Additionally, in the above-described preferred embodiments, in the diagnosis mode, although the state of the sensor portion 14 (normal or abnormal) is determined by the sensor control circuit 24, such a determination is not essential, the sensor control circuit 24 may transmit the data obtained in a detailed diagnosis for the sensor portion 14 to the outside, and the state of the sensor portion 14 (normal or abnormal) may be determined in the outside.

Additionally, in the above-described preferred embodiments and the variation of the preferred embodiments, as an operation example of the sensor control circuit 24 in the diagnosis mode, although descriptions of a detailed diagnosis of the sensor portion 14, a diagnosis of the sensor portion 14 or the like by remote control, and an update of the program stored by the sensor control circuit 24 have been provided, these three operations may be selectively performed, or all of them may be executed in order.

Additionally, in the above-described preferred embodiments, the wireless sensor 10 is installed in the storage box 50 in which the collected item 54 being kept in an art museum, a museum, or the like is stored, but is not limited to such an application. The wireless sensor 10 may also be installed in a location which needs to keep collecting an environment data, for example, temperature or the like, a location where temperature or the like needs to be monitored in a chemical plant, a location where gas leakage needs to be monitored in a gas plant, or the like.

Additionally, in the present preferred embodiment, the wireless sensor 10 is not necessarily stored in one housing, may be separated in a plurality of portions, or may not necessarily be portable.

Preferred embodiments of the present invention are able to be utilized as a wireless sensor which wirelessly transmits data obtained by a sensor, for example, as a portable wireless sensor installed in a storage box in which a collected item being kept in an art museum, a museum, or the like is stored.

While preferred embodiments of the present invention have been described above, it is to be understood that additional variations and modifications will be apparent to those skilled in the art without departing from the scope and spirit of the present invention. The scope of the present invention, therefore, is to be determined solely by the following claims.

What is claimed is:
1. A wireless sensor comprising:
a power source supplying electric power;
a sensor;
a wireless communication circuit operating with the electric power supplied from the power source; and
a sensor control circuit operating with the electric power supplied from the power source, obtaining data indicating a result detected by the sensor, and transmitting the obtained data to an outside through the wireless communication circuit; wherein
the power source includes:
a secondary battery;
a power reception circuit receiving electric power supply in a non-contact manner; and
a power source control circuit controlling charging of the secondary battery with the electric power received by the power reception circuit, and supplying electric power from the secondary battery and the electric power received by the power reception circuit to the wireless communication circuit and the sensor control circuit; and
the wireless sensor includes, as an operation mode, a standard mode to transmit the data obtained from the sensor by the sensor control circuit to the outside through the wireless communication circuit, and a diagnosis mode to diagnose at least one of the secondary battery and the sensor in a case where the power reception circuit receives electric power supply in the non-contact manner.

2. The wireless sensor according to claim 1, wherein in the diagnosis mode, the power source control circuit diagnoses the secondary battery while charging the secondary battery with the electric power received by the power reception circuit.

3. The wireless sensor according to claim 2, wherein in the diagnosis mode, the power source control circuit further diagnoses the sensor by operating the sensor control circuit with the electric power received by the power reception circuit.

4. The wireless sensor according to claim 2, wherein in the diagnosis mode, the power source control circuit further operates the sensor control circuit by a control instruction transmitted from the outside through the wireless communication circuit by operating the wireless communication circuit and the sensor control circuit with the electric power received by the power reception circuit.

5. The wireless sensor according to claim 2, wherein
the sensor control circuit stores a program, obtains the data in accordance with the program, and transmits the obtained data through the wireless communication circuit; and
in the diagnosis mode, the power source control circuit further updates the program stored by the sensor control circuit by a program transmitted from the outside through the wireless communication circuit by operating the wireless communication circuit and the sensor control circuit with the electric power received by the power reception circuit.

6. The wireless sensor according to claim 1, wherein
the wireless sensor operates in the standard mode in a case where the power reception circuit does not receive the electric power supply in the non-contact manner; and
in the standard mode, the electric power from the secondary battery is supplied to the wireless communication circuit and the sensor control circuit, the sensor control circuit repeats acquisition of data indicating a result detected by the sensor and transmission of the obtained data through the wireless communication circuit in a constant or substantially constant period.

7. The wireless sensor according to claim 6, wherein in the standard mode, the sensor control circuit determines whether or not a voltage of the secondary battery is within a normal range, and only in a case where it is determined that the voltage is within the normal range, obtains the data and transmits the data through the wireless communication circuit.

8. The wireless sensor according to claim 6, wherein in the standard mode, the sensor control circuit determines whether or not a voltage of the secondary battery is within a normal range, and only in a case where it is determined that the voltage is not within the normal range, transmits a notification of a failure of the wireless sensor.

9. The wireless sensor according to claim 1, further comprising:
   a splash guard to prevent liquid leaked from the secondary battery from splashing.

10. The wireless sensor according to claim 9, wherein the splash guard includes an absorbent pad.

11. The wireless sensor according to claim 9, wherein the splash guard is located on a lower side in a vertical direction of the secondary battery.

12. The wireless sensor according to claim 1, wherein the wireless sensor is portable.

13. The wireless sensor according to claim 1, further comprising:
   a power reception antenna that receives the electric power supply in the non-contact manner; wherein
   the power reception circuit converts the electric power supply from AC electric power to DC electric power.

14. The wireless sensor according to claim 1, further comprising:
   a communication antenna; wherein
   the wireless communication circuit transmits the data obtained from the sensor by the sensor control circuit to the outside via the communication antenna; and
   the wireless communication circuit receives a control instruction transmitted from the outside via the communication antenna.

15. The wireless sensor according to claim 1, wherein the sensor includes at least one of an illuminance sensor that detects illuminance, an ultraviolet sensor that detects ultraviolet, an oxygen sensor that detects oxygen, a temperature that detects temperature, and a humidity sensor that detects humidity.

16. The wireless sensor according to claim 15, further comprising:
   a housing; wherein
   a cover of the housing includes a transparent cover if the sensor includes the illuminance sensor or the ultraviolet sensor; and
   the cover includes an opening portion if the sensor includes the oxygen sensor, the temperature sensor, or the humidity sensor.

17. The wireless sensor according to claim 1, wherein the secondary battery is a nickel-metal hydride battery.

18. The wireless sensor according to claim 1, wherein the wireless communication circuit includes a band pass filter that passes only a signal of a frequency band for wireless communication, and a transmission/reception circuit with a transmission amplifier.

19. The wireless sensor according to claim 1, wherein the power source further includes a capacitor that smoothes the electric power supplied from the power reception circuit to the wireless communication circuit or the sensor control circuit, or to the secondary battery through the power source control circuit.

20. A wireless sensor network, comprising:
   a plurality of wireless sensors, the plurality of wireless sensors including the wireless sensor according to claim 1; and
   a wireless gateway that connects each of the plurality of wireless sensors to a communication network.

* * * * *